Nov. 8, 1955
E. M. McELHINNEY
2,722,925
VALVE GUIDE
Filed July 3, 1953
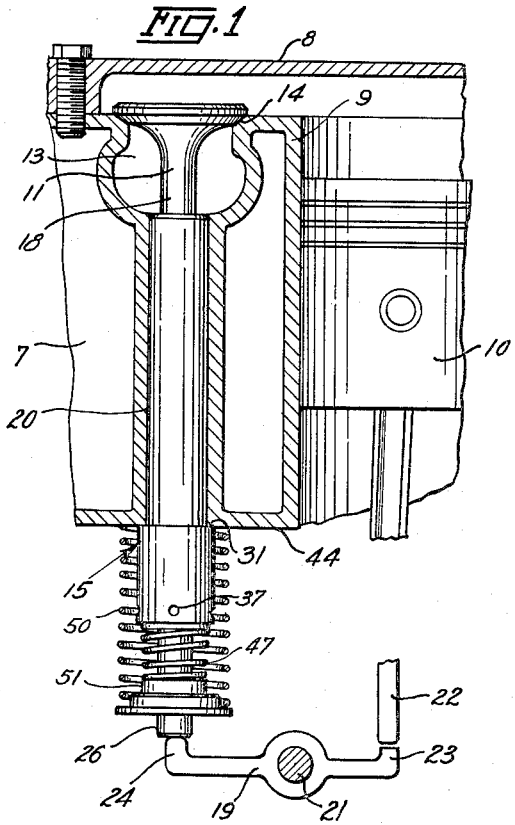
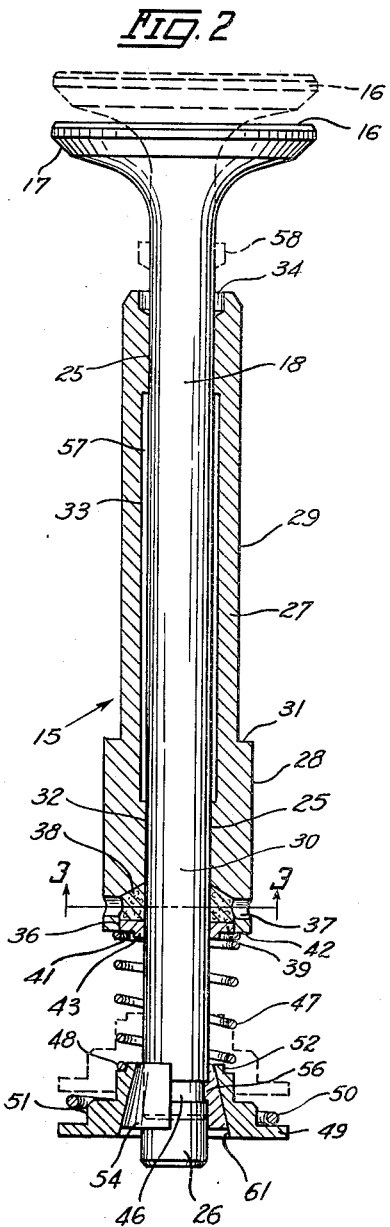
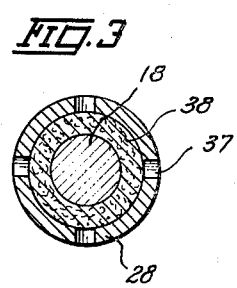
INVENTOR.
ERIC M. MCELHINNEY
BY
ATTORNEY.

United States Patent Office 2,722,925
Patented Nov. 8, 1955

2,722,925
VALVE GUIDE
Eric M. McElhinney, Dysart, Iowa

Application July 3, 1953, Serial No. 365,891

2 Claims. (Cl. 123—90)

This invention relates generally to valve guides or bearings for poppet type valves in an internal combustion engine and more particularly to a valve guide which is of a construction to effectively control the lubrication of the valve stem to attain an overall low friction action of the valve.

In internal combustion engines employing valves of the conventional poppet type, the lubrication of the valve stems is accomplished by supplying oil at the free end of the stem for progressive feeding or penetration toward the head end of the valve. However, due to the construction of the valve guides now in common use, little, if any, of the oil thus supplied to the free end of the valve stem is ever fed or penetrates to the opposite end of the valve stem. These valves, therefore, generally operate "dry" with a squeaky, hard action with attending hard and dry carbon formations on the valve head and valve seat, and with a resultant inefficient engine operation.

It is an object of this invention, therefore, to provide an improved valve guide for controlling the flow of oil along the valve stem and preventing formations of hard and dry carbon on the valve head and valve seat.

A further object of this invention is to provide a valve guide for the valve stem of a poppet type valve which includes means for retaining oil in the valve guide to adequately lubricate the valve stem and avoid sticking and excessive wear of the stem.

Still another object of this invention is to provide a valve guide of a one piece construction having an axial valve stem receiving bore with sections of varying diameters and with certain of such bore sections being in a close working tolerance with the valve stem.

Another object of this invention is to provide a valve guide which is rugged in construction, economical to manufacture, capable of being readily installed on most type engines now in use, and adapted to effectively provide for the lubrication of a valve stem with the elimination of any objectionable carbon formations on the valve head or valve seat.

Further objects, features and advantages of this invention will become apparent from the following description when taken in connection with the accompanying drawing in which:

Fig. 1 is a fragmentary vertical sectional view of a part of an internal combustion engine showing one of the valves therefor in an assembly relation with the valve guide of this invention;

Fig. 2 is an enlarged longitudinal sectional view of the valve and valve guide assembly shown in Fig. 1; and Fig. 3 is a transverse sectional view as seen along the line 3—3 in Figure 2.

With reference to the drawing, the valve guide of this invention, indicated generally at 15, is shown in Fig. 1 in assembly relation with an internal combustion engine, of a usual type, having a cylinder block 7, a cylinder head 8, a cylinder 9, a piston 10 and a usual type poppet valve 11. The valve 11 has a head 16 and a stem 18, with the seat 17 on the head 16 being adapted for seating engagement with a valve seat 14 formed on the block 7 between a passage 13 which may be for either intake or exhaust purposes, and the cylinder head 8.

The valve stem 18 is extended through the valve guide 15, which is in a press fit within a bore 20 formed in the block 7. For reciprocating the valve 11 at proper intervals of time, a usual rocker arm 19 (Fig. 1) is mounted on a rocker shaft 21. The rocker arm 19 is actuated by a usual tappet or push rod 22, only an end portion of which is shown, which acts against one end 23 of the rocker arm 19 to force the opposite end 24 of the rocker arm 19 into contact with the projected end 26 of the valve stem 18 whereby to move the valve head 16 into and out of seated engagement with the valve seat 14, all in a manner which is well known.

The valve guide 15 (Fig. 2) includes an elongated cylindrical body member 27 having a section 28, adjacent the valve stem end 26, of an enlarged diameter whereby to form an annular shoulder 31 at the juncture of the section 28 with the main section 29 of the body member 27. Extended longitudinally of the body member 27 is a bore 32 of a diameter only slightly larger than the diameter of the valve stem 18, with the bore 32 including an enlarged intermediate section 33 extended over the major portion of the length of the body member 27.

The bore 32, at its end adjacent the valve head 16, terminates in a relatively shallow counter-sunk or enlarged bore section 34. The opposite end of the bore 32 is formed with an enlarged section 36 which communicates with, or is open to, the inner ends of four radially extending passages or holes 37 (Figs. 2 and 3).

Received in the enlarged bore section 36 is an annular felt gasket or oil retaining member 38 having an outer diameter corresponding substantially to the diameter of the enlarged bore section 36 and an inner diameter corresponding to the diameter of the bore 32. An annular gasket retaining ring 39 arranged in the bore section 36 against the outer side of the gasket 38 has its outer surface 41 formed with an outwardly projected annular reduced section 43 for a purpose to appear later.

In assembly, the guide member 15 is frictionally received in a press fit engagement within the bore 20 formed in the cylinder block portion 7, such that the shoulder 31 on the valve guide body member 27 abuts the side 44 of the block 7. The valve stem 18 is then extended through the seat 14 into the longitudinal bore 32 in the body member 27 until the valve head 16 rests on the valve seat 14. Longitudinally spaced portions 25 of the bore 32 at opposite ends of the enlarged bore section 33 guidably engage the stem 18 and thus constitute bearing portions for guiding the reciprocating motion of the valve 11. As best appears in Fig. 2, an end portion 30 of the stem 18 is positioned outwardly of the end 42 of the body member 27. The gasket 38 and the retaining plate 39 are mounted about such projected stem portion 30 and moved within the enlarged bore section 36.

A helical compression spring 47 is positioned about the projected stem portion 30 such that one end of the spring 47 is arranged against the retainer ring 39 and about the reduced ring extension 43 which functions to maintain the spring 47 centered about the valve stem 18.

A mounting ring 49, arranged on the end portion 30 of the valve stem 18, has its inner side 51 of a stepped configuration and terminating in a reduced portion 52. The end 48 of the spring 47 is supported on the inner side 51 of the ring 49 and about the reduced portion 52 which maintains the end 48 of the spring 47 centered about the valve stem 18. A second or main valve spring 50, larger than the spring 47, is concentrically positioned about the spring 47 and the guide section 28 and arranged under compression between the ring 49 and the cylinder block 7.

The mounting ring 49 is formed with an outwardly tapered conical bore 61 for receiving in mating engagement a conical locking ring 54, of a conventional type, having an inwardly directed annular flange 56 receivable within an annular groove 46 formed in the valve stem 18. The locking ring 54 thus retains the springs 47 and 50 in compression between the mounting ring 49 and the retainer ring 39, and the mounting ring 49 and cylinder block 7, respectively. The compression spring 47 thus acts against the gasket 38 and the spring 50 acts to maintain the valve head 16 seated on the valve seat 14, so that raising movement of the valve head 16 off the seat 14 is primarily against the pressure of the spring 50.

In the operation of an engine which includes the valve guide 15, oil is either force fed or splashed about the end portion 30 of the valve stem 18. A portion of such oil moves along the stem 18 and into the annular space 57 between the enlarged bore section 33 and the stem 18. Thus lubrication is provided at the bearing 25 for stem end portion 30, and oil is supplied about the stem at the cavity 57. Oil within the space 57, at the end portion thereof adjacent to the cavity or countersunk portion 34, tends to become vaporized from the heat of combustion, whereby a sufficient pressure is set up to force or move oil from the space 57 along the stem 18 and outwardly from the guide 15 at the cavity 34. As a result the stem 18 is lubricated at both the bearing portions 25.

In the event excess oil is thus moved along the stem 18, such excess usually results in the forming of heavy carbon formations on the valve head 16 and the valve seat 14 as well as on portions of the stem 18 within the valve guide 15. These carbon formations thus act not only to prevent a proper seating of the valve head 16 but also impede the free movement of the valve stem 18 so as to effect what is generally referred to as a "sticky" valve. Under these conditions the efficiency of the engine is impaired and the valve soon "burns" out. On the other hand, an insufficient amount of oil moved along the stem 18, results in the inadequate lubrication of the stem 18 and consequent sticking and excessive wear of the stem 18. This condition, therefore, also results in a reduced engine efficiency, along with accelerating the useful service life of the valve.

These objectionable conditions are substantially eliminated in the present invention by the cooperative action of the gasket 38 with the radial passages 37 to regulate and control the amount of oil moved along the stem 18. The gasket 38 functions as a resilient oil retaining or holding member about the end portion 30 of the stem 18. On each movement of the valve head 16 away from its seat 14, when the spring 47 is compressed against the gasket retaining plate 39 the gasket 38 is also compressed whereby excess oil therein is forced outwardly through the radial passages 37. Only the oil remaining in the gasket or packing 38 is thus permitted to move along the stem into the reservoir 57. In this connection it is to be noted that the gasket 38 also functions as an oil wiper relative to the stem 18.

It will be appreciated that the oil permitted to move along the stem 18 into the reservoir 57 can be varied to meet desired lubricating conditions. In other words the thickness or composition of the gasket 38 can be varied to change the oil retaining capacity of the gasket, and the passages 37 can be varied in number and size to restrict or increase the flow of excess oil from the gasket.

The oil that is moved along the stem 18 from the reservoir 57 tends to accumulate in the annular cavity or countersunk portion 34 formed at the end of the body member 27 adjacent the valve head 16. This oil apparently carbonizes on the stem 18 both at and outwardly from the cavity 34 and as a result of the reciprocal movement of the stem 18 forms a carbon ring, indicated at 58 in Fig. 2, of a shape corresponding to the shape of the cavity 34. This carbon ring 58, on being formed, functions as a stop ring to prevent any oil from moving thereby to the valve head 16 and the seat 14.

It is seen, therefore, that the travel of oil along the stem 18 toward the valve head 16 is controlled by the cooperative action of the oil retaining gasket 38 and passages 37, the oil reservoir 57 located between the bearing portions 25, and the carbon formed oil stop ring 58.

From the actual observation of a valve 11 operated in an engine having the valve guide 15 of this invention, the carbon formed about the valve stem 18 was found to be soft and pliable. This soft carbon formation is apparently due to the vaporous or foam condition of the oil moving from the reservoir 57 toward the valve head 16. Also by virtue of this formed carbon being soft and pliable it is more readily wiped from the stem at the bottom of the countersunk portion 34, to form the carbon ring 58.

By virtue of the reservoir 57, and as previously mentioned, only the bearing portions 25 in the valve guide member 15 are in contact engagement with the stem 18. As a result a closer tolerance or working clearance can be maintained between the stem 18 and the bearing portions 25, as compared to such tolerance where the valve stem 18 is in bearing engagement over the full length of the guide member. This closer tolerance in connection with the spaced portions 25, results in a more positive and full seating of the valve head 16 within the seat 14, in addition to substantially eliminating any "sticky" action of the valve 11 due to binding. The binding action of a valve stem within a guide member having bearing engagement with the stem over the full length of the valve guide, is usually the result of such full length bearing being worn to a bell shape at the opposite ends thereof. Carbon then accumulates within such bell shaped portions with a consequent sticking or binding action of the valve. The closer tolerance between the bearing portions 25 and valve stem substantially eliminates any wearing of bell shaped portions at the bearings 25.

Where such a tolerance is not maintained during use of the valve, an increased tolerance due to wear usually results in a faulty valve action, especially for the inlet valves, due to the suction or intake action of the engine piston 10. In other words, during the intake of the combustible mixture into the cylinder 9, oil is drawn upwardly about the stem 18 and into the engine cylinder 9 so as to increase the use of oil by the engine as well as the forming of carbon on the valve 11. This action is often times referred to as "oil drinking." Any effect of such intake or suction action is eliminated in the present invention by the gasket 38, at the end portion 30 of the valve stem 18 in conjunction with the close working tolerance between the stem 18 and the bearing portions 25. By virtue of the controlled lubrication of the valve stem 18 this closer tolerance is maintained over a prolonged service life of the valve, while providing over such service life a low friction between the stem 18 and the valve guide 15.

The gasket 38 may be positioned directly against the end 42 of the valve guide 15 so as to eliminate the openings 37. However, it has been found desirable, for an increased service life of the gasket, to confine the spreading action thereof under compression by the spring 47.

Also, the gasket 38 is not required on exhaust valve, since the pressure of the gases exhausted from the cylinder 9, act to move the oil along the valve stem 18 from its head end toward the free end portion 30 thereof. In other words such pressure acts reversely to the pressure of the intake gases acting on an inlet valve stem. Thus for exhaust valves a proper lubrication is accomplished by the use of the reservoir 57, between the relatively short and close tolerance bearing portions 25.

It is seen, therefore, that there is provided, for a poppet type valve, a valve guide assembly adapted to effectively lubricate all portions of the valve so as to give a low friction acting valve, having positive seating characteristics over a prolonged service life. Where a valve working cycle is now accomplished in a time period of 1/33 of a second, and with higher engine speeds being proposed, it is apparent that an easy moving, quick and efficient acting valve is essential for a proper engine operation.

Although the invention has been described with respect to a preferred embodiment thereof, it is to be understood that it is not to be so limited since changes can be made therein which are within the full intended scope of this invention as defined by the appended claims.

I claim:

1. For use in an internal combustion engine having a poppet type valve which includes a valve stem formed on one end with a valve head and in which oil contacts the end of said valve stem remote from said valve head to lubricate the valve stem; an elongated guide member having a longitudinally extended bore formed therein for receiving said valve stem, with said bore being formed with an enlarged intermediate section and a counter-sunk portion at the end thereof adjacent to said valve head, with said enlarged intermediate section providing for the travel of oil along said valve stem to said valve head, and said counter-sunk portion, on operation of said engine, providing for the forming of a carbon ring on said valve stem corresponding in size to said counter-sunk bore section and constituting an oil stop ring on said valve stem.

2. For use with a poppet type valve having a valve head and a valve stem, an elongated guide member having a bore extended longitudinally therethrough for receiving said valve stem with said bore having an intermediate portion of a diameter substantially greater than said valve stem to provide an annular space between said guide member and said valve stem so that said valve stem is in bearing engagement with said guide member only at opposite ends of said bore, said guide member, at the end thereof remote from said valve head, being formed with an annular cavity open to said bore, and a resilient oil retaining packing means arranged in said cavity and about said valve stem with said guide member being formed with openings communicating with and extended outwardly from said cavity.

References Cited in the file of this patent

UNITED STATES PATENTS

| | | |
|---|---|---|
| 731,452 | Hamfeldt | June 23, 1903 |
| 1,602,304 | Heldt | Oct. 5, 1926 |
| 1,894,859 | Gabel et al. | Jan. 17, 1933 |
| 1,975,837 | Ford | Oct. 9, 1934 |
| 1,983,538 | Clifton | Dec. 11, 1934 |
| 2,175,261 | Harbaugh | Oct. 10, 1939 |
| 2,381,541 | Hoy | Aug. 7, 1945 |
| 2,411,844 | Appel | Dec. 3, 1946 |